W. B. LASHAR.
RETAINER FOR TIRE REPAIR DEVICES.
APPLICATION FILED JUNE 24, 1912.
1,159,320.
Patented Nov. 2, 1915.
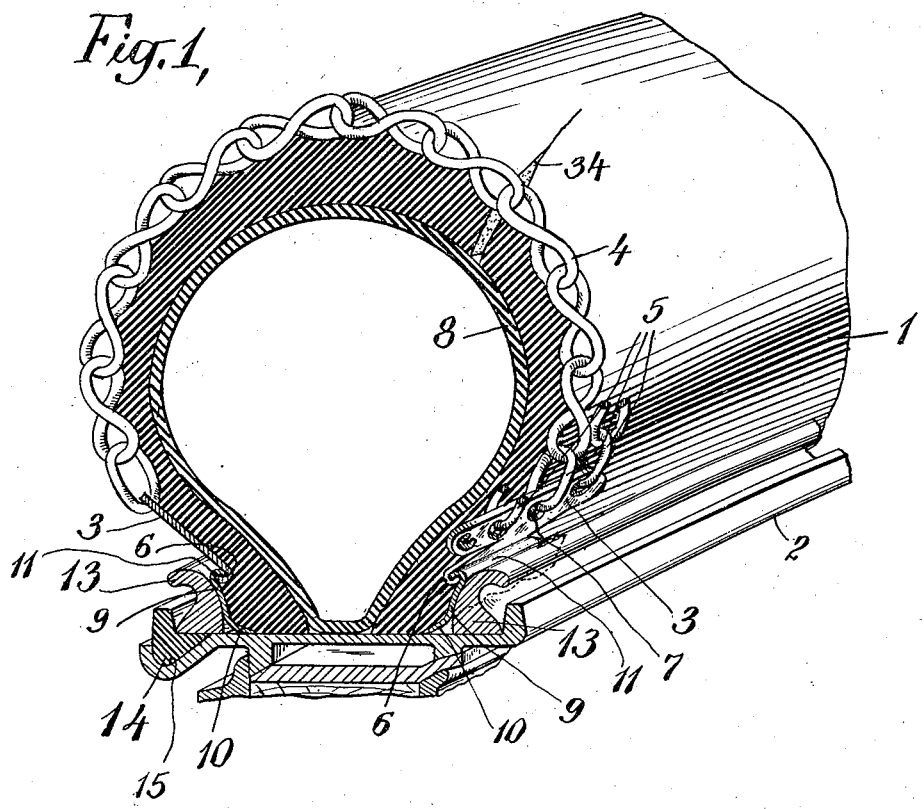
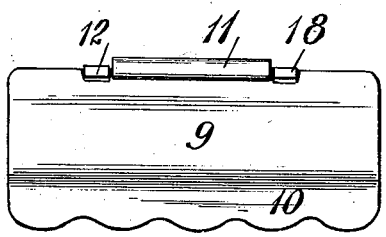
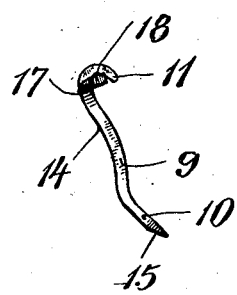
WITNESSES
Walter B Lashar INVENTOR
BY
Duncan & Duncan ATTORNEYS

UNITED STATES PATENT OFFICE.

WALTER B. LASHAR, OF BRIDGEPORT, CONNECTICUT, ASSIGNOR TO AMERICAN CHAIN COMPANY, INCORPORATED, OF BRIDGEPORT, CONNECTICUT, A CORPORATION OF NEW YORK.

RETAINER FOR TIRE-REPAIR DEVICES.

1,159,320.     Specification of Letters Patent.     Patented Nov. 2, 1915.

Application filed June 24, 1912. Serial No. 705,680.

*To all whom it may concern:*

Be it known that I, WALTER B. LASHAR, a citizen of the United States, and resident of Bridgeport, Fairfield county, Connecticut, have made a certain new and useful Invention Relating to Retainers for Tire-Repair Devices, of which the following is a specification, taken in connection with the accompanying drawing, which forms part of the same.

This invention relates especially to retainer plates for tire repair devices of the Dobbins type and adapted to hold such repair devices in position in connection with straight side pneumatic tires, the retainer plates preferably having curved back or outside portions substantially conforming to the rim flanges and having inturned gripping portions to be securely held under the rim portions of the tire shoe so as to hold the retainers in position with their retainer hooks or sockets on substantially the same level with the usual clencher flanges used with that size of tire.

In the accompanying drawing showing in a somewhat diagrammatic way an illustrative embodiment of this invention, Figure 1 is a perspective view showing the method of attachment of these retainers and their coöperation with a repair device. Fig. 2 is a face view of one of the retainers; and Fig. 3 a side view thereof.

As shown somewhat diagrammatically in Fig. 1, the tire shoe 1 is mounted on a rim 2 in connection with which reversible or removable rim flanges 13 are shown, one of these flanges being disengageably held in position by the holding ring 14 coöperating with the recess 25 in the rim. As illustrated these rims coöperate with a Goodyear or straight side type tire shoe 1 of ordinary construction, the usual reinforcing wires not being shown in the rim portions of the tire shoe. The inner tube 8 is shown inside the tire shoe which as diagrammatically illustrated has a puncture 34 therein. The Dobbins type repair device coöperating with the tire adjacent this puncture may as illustrated comprise the anchor plates 3 having the anchor hooks 6 formed adjacent the middle portions thereof and also having suitable holes or holding apertures 7 with which attaching members or links 5 may coöperate in any desired way so as to connect the curb securing chains 4 with these anchor plates which serve to hold the securing chains in tight engagement with the tire so that they become more or less embedded therein and prevent working of the tire shoe adjacent a punctured or weakened portion where the repair device is applied. The repair device is of such length that the anchor hooks 6 are adapted to properly engage with the standard clencher flanges of tires of the corresponding size and the retainer devices are so constructed as to be rigidly held in position so as to have their retainer hooks lie at the same effective height from the rim as such clencher flanges. A suitable form of retainer 9 for this purpose may as indicated be formed of stamped sheet steel or other suitable material preferably having a curved back or outside portion 14 conforming to the rim flange and having a suitable retainer socket 17 formed therein, as for instance, by providing a suitable retainer hook 11 which may be formed integral with the retainer itself so as to be engaged by the anchor hook 6. If desired also suitable lugs or detents such as 18 may be stamped out from the adjacent portions of the retainer so as to project at each end of the retainer socket and prevent longitudinal displacement of the anchor hook with respect thereto. The retainer is also preferably formed with a suitable inturned gripping portion adapted to project beneath the rim portion of the tire shoe to such extent as to have ample and reliable holding contact in connection therewith; and with the usual reinforced rim portions a curved gripping portion 10 diagonally bridging the angle between the rim flange and the rim and projecting only part way beneath the rim portion of the tire shoe gives sufficient gripping engagement or holding strength for ordinary service conditions.

The retainer is preferably formed with a bevel edge 15 which may be located on the lower or outside face of the retainer which also serves to facilitate its insertion preferably when the tire is only partly inflated. The retainer is also preferably formed with a serrated edge which may be formed with substantially uniform curved scalloped recesses and projections to facilitate the riding up of the tire shoe upon it, although it is of course understood that the gripping portion of the retainer need not be beveled or serrated as indicated. When the tire is inflated the rim portions are forced outward by the internal pressure so as to ride up on the inturned gripping portions of the retainer and force the retainer back into firm engagement with the rim flanges. Such retainers having an effective height equal to the height of the standard clencher flanges are highly desirable in connection with tire repair devices of the Dobbins or other type, since they may be sold and used in connection therewith making the repair device perfectly applicable to either a clencher or straight side tire.

Having described this invention in connection with a number of illustrative embodiments, forms, proportions, numbers of parts, materials and arrangements, to the details of which disclosure, the invention is not of course to be limited what is claimed as new and what is desired to be secured by Letters Patent is set forth in the appended claims.

1. The retainer suitable for use in connection with tire repair devices and comprising a retainer plate having a retainer socket at its upper end formed by an integral hook and lugs adjacent the ends of said hook, said retainer having a curved outside portion substantially conforming to the rim flange of the tire and having an inturned gripping portion adapted to project diagonally only part way beneath the rim portion of the tire shoe when the tire is inflated, said gripping portion being formed with an edge bevel on its lower edge and with a serrated lower edge to facilitate insertion between the tire and rim flange, said retainer hook having substantially the same effective height as the clencher flange for the corresponding size tire.

2. The retainer suitable for use on straight side tires in connection with tire repair devices and comprising a retainer plate having an integral holding device at its upper end, the upper portion of said retainer plate having a curved outside portion substantially conforming to the rim flange of the straight side tire and having an inturned gripping portion adapted to project diagonally only part way beneath the rim portion of the tire show when the tire is inflated, said gripping portion being formed with an edge bevel on its lower edge to facilitate insertion between the tire and rim flange and being curved to bridge diagonally across the junction between the rim flange and rim to be forcibly engaged and held by the tire at this point, said holding device having substantially the same effective height as the clencher flange for the corresponding size tire.

WALTER B. LASHAR.

Witnesses:
MARY M. DAY,
MARY C. DOLAN.